UNITED STATES PATENT OFFICE.

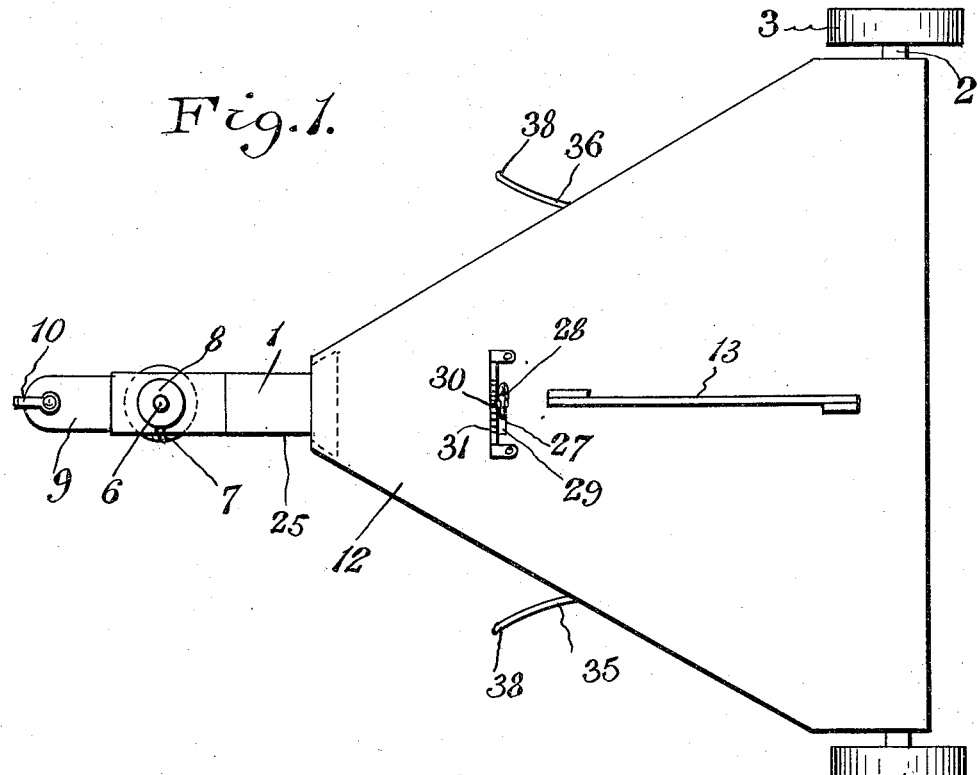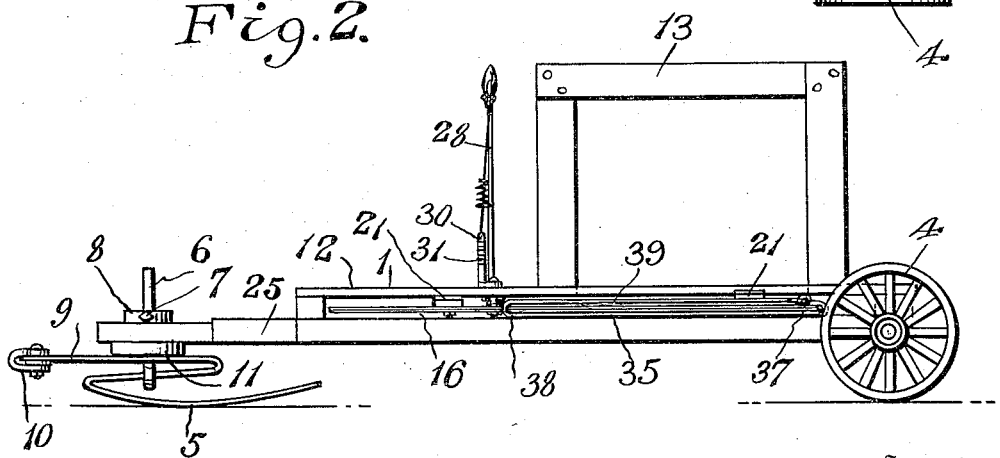

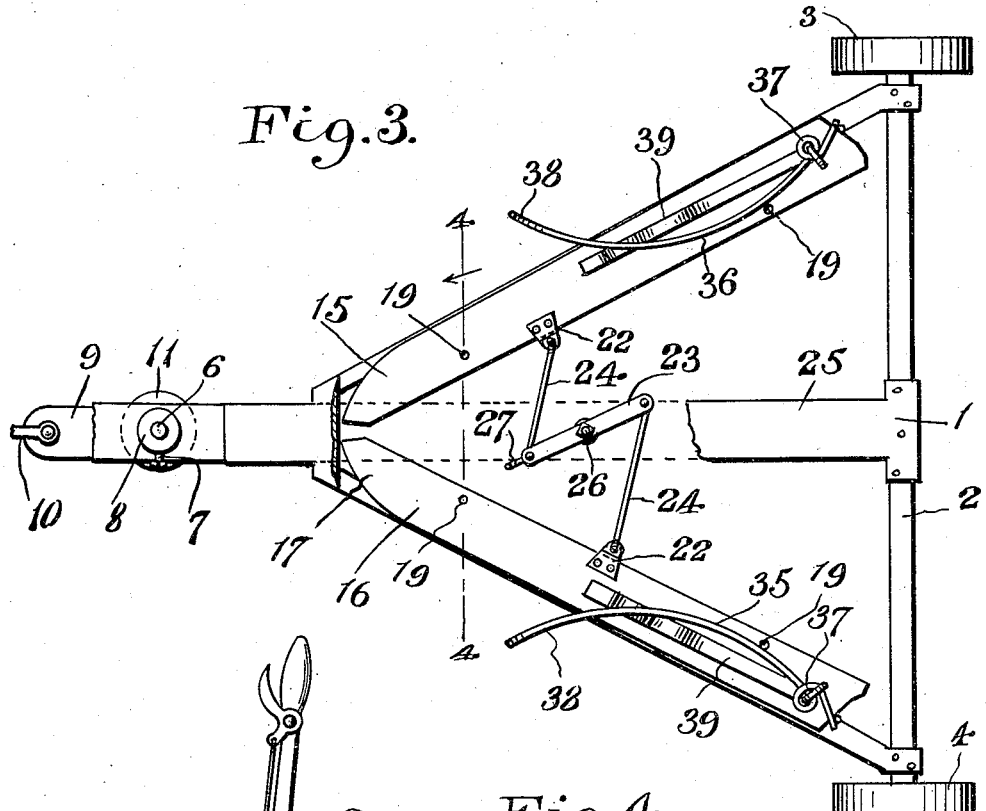

WILLIAM H. S. RITCHIE, OF WEST POINT, KENTUCKY.

CORN-HARVESTER.

1,152,660.  Specification of Letters Patent.  Patented Sept. 7, 1915.

Application filed March 12, 1914. Serial No. 824,157.

*To all whom it may concern:*

Be it known that I, WILLIAM H. S. RITCHIE, a citizen of the United States, residing at West Point, in the county of Hardin and State of Kentucky, have invented certain new and useful Improvements in Corn-Harvesters; and I do hereby declare the following to be a full, clear, and exact description of the invention, such as will enable others skilled in the art to which it appertains to make and use the same.

This invention relates to harvesters and more particularly to a device for cutting or harvesting corn and the primary object of the same is the provision of a device which will materially decrease the manual labor contingent with the harvesting of corn.

Another object of this invention is the provision of a corn harvester as specified which has a plurality of cutting knives disposed obliquely of the line of travel of the harvester, which knives are adjustably carried by a platform for movement into or out of a cutting position, the marginal edges of the platform forming guards for the knives when the latter are not in use.

A still further object of this invention is the provision of means carried by the knives to insure the cutting of every stalk of corn in the path of the harvester and to prevent the stalks from bending or falling laterally of the machine and avoiding being cut by the blades.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts through the several views, and in which:—

Figure 1 is a top plan view of the improved corn harvester. Fig. 2 is a side elevation of the harvester. Fig. 3 is a plan view showing the upper platform removed, for exposing the mechanism for operating the knives. Fig. 4 is a sectional view on the line 4—4 of Fig. 3. Fig. 5 is a detail sectional view showing the connection between the knives and the mechanism for moving them into or out of their cutting position, also illustrating the guard carried by the knives to insure the cutting of every stalk of corn in the path of the harvester. Fig. 6 is a detail view of a quadrant and lever used for operating the cutting knives.

Referring more particularly to the drawings, 1 designates the frame or running gear of the harvester, which has the rear axle 2 connected thereto and rotatably supporting the traction wheels 3 and 4 upon its terminal ends. The frame or running gear 1 of the corn harvester is substantially triangular shaped in plan, having a shoe 5 connected to the under surface of the apex, which shoe is constructed of resilient material, bent sinuously to form a resilient support for the front end of the frame 1, and it is adjustably connected thereto by a rod 6 and a thumb screw supporting collar 8. The rod 6 is secured to the shoe 5 in any suitable manner, and extends upwardly through the front end of the frame 1, having the collar 8 disposed thereupon and abutting the upper surface of the front end of the frame as is clearly shown in Fig. 2 of the drawings. The collar 8 is held in binding engagement with the rod 6 by the thumb screw 7, which extends through the collar and engages the rod, for supporting the shoe at various vertical elevations upon the frame 1. The shoe 5 has its end 9 extending forwardly of the front terminus of the frame 1, which end has a clevis 10 swivelly carried thereby for attachment to a double-tree (not shown) for hooking or harnessing horses (not shown) to the harvester. A fifth wheel 11 is carried by the front end of the frame 1, and the shoe 5 so as to permit of radial adjustment of the shoe, to permit the harvester to round or turn corners. The frame 1 of the harvester has a platform 12 mounted thereupon, which platform completely covers the frame and has an upright 13 centrally located therein and extending parallel with the line of travel of the harvester, which upright forms a brace or support for the stalks of corn after they are cut by the knives 15 and 16. The knives 15 and 16 are positioned along the forward edges of the frame 1, and the platform 12, being disposed obliquely to the line of travel of the harvester and having their forward ends rounded as is clearly shown at 17, so as to provide a cutting engagement with the stalks of corn, and also provide a slanting approach for the corn stalks to the blades so as to prevent the clogging of the machine, by the stalks.

The knives 15 and 16 have bolts 19 rigidly secured thereto and spaced apart, being adjacent their terminal ends. The bolts 19 extend upwardly through the knives and have their heads 20 slidably seated in guide ways 21 which are carried by the under surface of the platform 12, the bolts 19 and the guide-ways 21 forming guide-ways for the regulating of the adjustment of the knives. The knives 15 and 16 have rigidly connected to their inner edges ears 22, which ears have swiveled link connection to the bar 23, through the medium of the links 24. The links 24 are swivelly connected to the opposite ends of the bar 23, which bar is pivotally mounted upon the central brace 25 of the frame 1 as is shown at 26. The bar 23 has a projection 27 formed upon one end thereof, which projection is connected in any suitable manner to a hand lever 28, which hand lever projects upwardly through a slot 29 formed in the platform 12 and has a dog mechanism 30 carried thereby which coacts with a quadrant 31 for moving the knives 15 and 16, and holding them in adjusted horizontal position for placing them into or out of a position to be engaged by the corn stalks. In Fig. 1 of the drawings the knives 15 and 16 are moved inwardly, so as to be positioned beneath the platform 12 and out of a position to be engaged by the corn stalks upon the travel of the harvester. When the knives are positioned out of a cutting position, the marginal edges of the platform 12 form guards for the cutting edges of the knives, so as to prevent these blades from accidentally cutting persons, horses or the like.

The knife blades 15 and 16 have the terminal ends of arcuate resilient guard members 35 and 36 securely connected thereto in any suitable manner. The terminal ends of the guard members 35 and 36 are provided with resilient convolutions 37 so as to hold the free terminal ends 38 of the guard members in spaced relation to the cutting edges of the knives. The guard members 35 and 36 are constructed of resilient wire, being substantially U-shaped and having the sides or legs thereof positioned upon opposite sides of the knife blades, as is clearly shown in Fig. 5 of the drawings. The guard members 35 and 36 extend arcuately outwardly from the points of connection to the blades and have their terminal ends, as has been heretofore stated, spaced outwardly from the cutting edges of the knife blades 15 and 16, so as to receive therebetween, any stalks of corn which are slightly bent out of the usual path of the row, and guide the stalks inwardly to engagement with the cutting edges of the knives, so that the stalks will be severed and not passed by the harvester. Flat springs 39 are positioned upon the upper surface of the knife blades 15 and 16 and engage the upper side or leg of the U-shaped guide members, so as to hold them against vertical oscillation. By the provision of the resilient convolutions 37 upon the ends of the guard members which are attached to the knife blades, the guard members 36 and 35 will be permitted to move outwardly, upon contact with a stalk of corn, so as to properly guide the stalks of corn. In the operation of the improved corn harvester as specified, the knife blades 15 and 16 are moved horizontally through the medium of the actuation of the lever 28 so that they will extend marginally beyond the edges of the platform 12, and be in position for engagement with the stalks of corn in adjacent rows, when the harvester is driven through a corn field. The knives being disposed obliquely to the line of travel of the corn harvester, they will engage the stalks of corn, and upon further traction of the harvester the corn stalks (not shown) will move along the edges of the knife blades, and the sliding engagement between the corn stalks and the sharpened edges of the knives will cut or sever the stalks from the roots, allowing them to fall inwardly on to the platform 12, when they are gathered up by a man standing thereon, and disposed of according to his desires. When the corn harvester is not in use, the cutting knives 15 and 16 are moved inwardly, beneath the platform 12 by the actuation of the lever 28, and positioned so that they will not protrude beyond the marginal edges of the platform to be engaged by anything in the path of the harvester.

From the foregoing description taken in connection with the accompanying drawings the advantages of the construction and of the method of operation of the improved corn harvester will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What I claim is:—

1. In a corn harvester, a supporting base, a pair of cutting knives carried by said base, substantially U-shaped guard members formed of resilient wire and having their legs positioned upon opposite sides of said knives, the apexes of said guards curving outwardly from said knives for guiding corn stalks to said knives, and means for yieldably supporting said guards for permitting of a limited yieldable movement thereof toward or from said knives.

2. In a corn harvester, a supporting base, a pair of cutting knives pivotally carried by said base, substantially U-shaped guard members formed of resilient wire and having their legs positioned upon opposite sides of said knives, the apexes of said guards curving outwardly from said knives for guiding corn stalks to said knives, means for yieldably supporting said guards for permitting of a limited yieldable movement thereof toward or from said knives, a pair of rods connected to said knives, a lever pivotally connected to said supporting base, said rods connected to the end of said lever for moving said knives inwardly or outwardly upon oscillatory movement of the lever.

3. In a corn harvester, a supporting base, a pair of cutting knives carried by said base, substantially U-shaped guard members formed of resilient wire and having their legs positioned upon opposite sides of said knives, the apexes of said guards curving outwardly from said knives for guiding corn stalks to said knives, means for yieldably supporting said guards for permitting of a limited yieldable movement thereof toward or from said knives, flat springs secured to said knives and engaging the uppermost legs of said guards for holding them in proper spaced relation to said knives.

4. In a corn harvester, a supporting base, a pair of cutting knives pivotally carried by said base, substantially U-shaped guard members formed of resilient wire and having their legs positioned upon opposite sides of said knives, the apexes of said guards curving outwardly from said knives for guiding corn stalks to the knives, said guard members having their ends bent to form resilient convolutions for yieldably supporting said guards for permitting of a limited yieldable movement of the guards toward or from said knives, flat springs secured to said blades and engaging the uppermost legs of said guards for holding them in proper spaced relation to said knives, a pair of rods connected to said knives, a lever pivotally connected to said supporting base, said rods connected to the ends of said lever for moving said knives inwardly or outwardly upon oscillatory movement of the lever.

5. In a corn harvester, a substantially triangularly shaped supporting base, supporting traction wheels connected to the base angles of said base, a sinuously bent resilient supporting shoe carried by the apex of said base, a pair of cutting knives pivotally carried by said base, substantially U-shaped guard members formed of resilient wire and having their legs positioned upon opposite sides of said knives, the apexes of said guards curving outwardly from said knives for guiding corn stalks to the knives, and means for yieldably supporting said guards for permitting of a limited yieldable movement toward or from said knives.

6. In a corn harvester, a substantially triangularly shaped supporting base, supporting traction wheels connected to the base angles of said base, a sinuously bent resilient supporting shoe carried by the apex of said base, a pair of cutting knives pivotally carried by said base, substantially U-shaped guard members formed of resilient wire and having their legs positioned upon opposite sides of said knives, the apexes of said guards curving outwardly from said knives for guiding corn stalks to the knives, the ends of the legs of said guards being bent for forming resilient coils for permitting of a limited yieldable movement of said guards toward or from said knives, a pair of rods connected to said knives, a lever pivotally connected to said supporting base, said rods connected to the ends of said lever for moving said knives inwardly or outwardly upon oscillatory movement of said lever.

7. In a corn harvester, a substantially triangularly shaped supporting base, supporting traction wheels connected to the base angles of said base, a sinuously bent resilient supporting shoe carried by the apex of said base, a pair of cutting knives pivotally carried by said base, substantially U-shaped guard members formed of resilient wire and having their legs positioned upon opposite sides of said knives, the apexes of said guards curving outwardly from said knives for guiding corn stalks to the knives, the ends of the legs of said guards being bent for forming resilient coils for permitting of a limited yieldable movement of said guards toward or from said knives, a pair of rods connected to said knives, a lever pivotally connected to said supporting base, said rods connected to the ends of said lever for moving said knives inwardly or outwardly upon oscillatory movement of said lever, flat springs secured to said blades and engaging the uppermost legs of said guards for holding them in proper spaced relation to said knives.

In testimony whereof I affix my signature in presence of two witnesses.

WILLIAM H. S. RITCHIE.

Witnesses:
J. W. DOWNARD,
E. M. WRIGHT.

Copies of this patent may be obtained for five cents each, by addressing the "Commissioner of Patents, Washington, D. C."